(12) United States Patent
Li

(10) Patent No.: US 12,507,181 B2
(45) Date of Patent: Dec. 23, 2025

(54) METHOD FOR INDICATING TRANSMIT POWER, METHOD FOR DETERMINING TRANSMIT POWER, TERMINAL, DEVICE, AND MEDIUM

(71) Applicant: Beijing Xiaomi Mobile Software Co., Ltd., Beijing (CN)

(72) Inventor: Mingju Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 359 days.

(21) Appl. No.: 18/003,070

(22) PCT Filed: Aug. 21, 2020

(86) PCT No.: PCT/CN2020/110501
§ 371 (c)(1),
(2) Date: Dec. 22, 2022

(87) PCT Pub. No.: WO2022/036685
PCT Pub. Date: Feb. 24, 2022

(65) Prior Publication Data
US 2023/0262615 A1    Aug. 17, 2023

(51) Int. Cl.
*H04W 52/36* (2009.01)
*H04W 52/14* (2009.01)
(Continued)

(52) U.S. Cl.
CPC ....... *H04W 52/367* (2013.01); *H04W 52/146* (2013.01); *H04W 74/0833* (2013.01); *H04W 74/0836* (2024.01)

(58) Field of Classification Search
CPC . H04W 16/28; H04W 74/08; H04W 74/0833; H04W 52/42; H04W 72/21;
(Continued)

(56) References Cited

U.S. PATENT DOCUMENTS

2018/0167897 A1   6/2018  Sampath et al.
2019/0261289 A1*  8/2019  Raghavan ........... H04W 52/367
(Continued)

FOREIGN PATENT DOCUMENTS

CN       111436105 A        7/2020
WO    WO 2020143761 A1     7/2020

OTHER PUBLICATIONS

Examination Report for India Application No. 202247076915, issued on Sep. 14, 2023, 5 pages.
(Continued)

*Primary Examiner* — Tu X Nguyen
(74) *Attorney, Agent, or Firm* — Finnegan, Henderson, Farabow, Garrett & Dunner, L.L.P.

(57) ABSTRACT

A method for indicating a transmit power is performed by a terminal, and includes: determining a maximum permissible transmit power of at least one uplink beam of the terminal, wherein the maximum permissible transmit power is a maximum transmit power subject to satisfying a maximum permissible exposure (MPE) limit of the terminal; and transmitting first indication information for indicating the maximum permissible transmit power of the at least one uplink beam.

14 Claims, 10 Drawing Sheets

(51) Int. Cl.
*H04W 74/0833* (2024.01)
*H04W 74/0836* (2024.01)

(58) Field of Classification Search
CPC ............. H04W 74/00; H04W 72/1268; H04W 52/367; H04W 52/146; H04W 52/365
See application file for complete search history.

(56) References Cited

U.S. PATENT DOCUMENTS

| | | |
|---|---|---|
| 2020/0112926 A1 | 4/2020 | Laghate et al. |
| 2021/0282093 A1* | 9/2021 | Taherzadeh Boroujeni ................ H04W 52/247 |
| 2021/0391913 A1* | 12/2021 | Zhou ................... H04W 52/146 |

OTHER PUBLICATIONS

European Patent Office, Extended European Search Report issued in Application No. 20949893.0, dated Sep. 8, 2023, 9 pages.

International Search Report and Written Opinion of International Application No. PCT/CN2020/110501, mailed May 19, 2021, 13 pages.

Nokia, Nokia Shanghai Bell; UE FR2 MPE enhancements and solutions; 3GPP TSG RAN WG4 Meeting #93, R4-1914274, Reno, USA, Nov. 18-22, 2019, 7 pages.

Nokia, Nokia Shanghai Bell; FR2 Mpe mitigation solutions; 3GPP TSG-RAN WG4 Meeting #92bis, R4-1911526, Chongqing, China, Oct. 10, 2019-Oct. 18, 2019, 4 pages.

* cited by examiner

METHOD FOR INDICATING TRANSMIT POWER, METHOD FOR DETERMINING TRANSMIT POWER, TERMINAL, DEVICE, AND MEDIUM

CROSS-REFERENCE TO RELATED APPLICATION

This application is a US national phase of International Application No. PCT/CN2020/110501 filed on Aug. 21, 2020, the entire content of which is incorporated herein by reference.

TECHNICAL FIELD

The disclosure relates to the field of communication technologies, and more particularly, to a method, a terminal, a device, and a medium for indicating and determining a transmit power.

BACKGROUND

In $5^{th}$ generation (5G) new radio (NR) technologies, especially when communication frequency bands are within frequency range 2 (FR2), beam-based transmission and reception is used to ensure the coverage because high-frequency channels attenuate rapidly.

In the related art, when a terminal transmits a beam through an antenna panel, there is a maximum permissible exposure (MPE) limit to avoid harm to the human body. When an exposure amount brought by a transmit power used in a transmit beam exceeds the MPE limit, the transmit power of the beam needs to be limited, for example, the transmit power of the beam is controlled to back off, which will affect an uplink transmission performance of the terminal.

SUMMARY

According to an aspect of the disclosure, a method for indicating a transmit power is provided, including: determining a maximum permissible transmit power of at least one uplink beam of a terminal, in which the maximum permissible transmit power is a maximum transmit power subject to satisfying a maximum permissible exposure (MPE) limit of the terminal; and transmitting first indication information for indicating the maximum permissible transmit power of the at least one uplink beam.

According to an aspect of the disclosure, a method for determining a transmit power is provided, including: receiving first indication information for indicating a maximum permissible transmit power of at least one uplink beam of a terminal, wherein the maximum permissible transmit power is a maximum transmit power subject to satisfying a MPE limit of the terminal; and determining the maximum permissible transmit power of the uplink beam based on the first indication information.

According to an aspect of the disclosure, a terminal is provided, including: a processor: and a memory for storing instructions executable by the processor; in which the processor is configured to load and execute the executable instructions to perform the above method for indicating a transmit power.

According to an aspect of the disclosure, a network device is provided, including: a processor; and a memory for storing instructions executable by the processor; in which the processor is configured to load and execute the executable instructions to perform the above method for determining a transmit power.

According to an aspect of the disclosure, a computer-readable storage medium is provided. When instructions in the computer-readable storage medium are executed by a processor, the above method for indicating a transmit power is executed, or the above method for determining a transmit power is executed.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Figure 1:
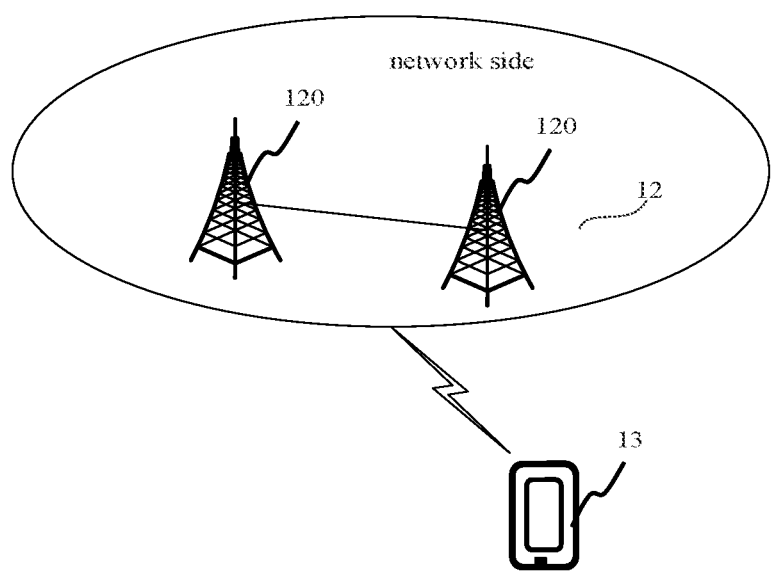
FIG. 1 is a block diagram illustrating a communication system according to some embodiments of the disclosure.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

Terms used in embodiments of the disclosure are merely for describing specific examples and are not intended to limit the embodiments of the disclosure. The singular forms "a", and "the" used in the embodiments of the disclosure and the appended claims are also intended to include the multiple forms, unless other meanings are clearly represented in the context. It should also be understood that the term "and/or" used in the disclosure refers to any or all of possible combinations including one or more associated listed items.

It should be understood that although terms "first". "second", "third", and the like are used in embodiments of the disclosure to describe various information, the information is not limited to the terms. These terms are merely used to differentiate information of a same type. For example, without departing from the scope of the embodiments of the disclosure, first information is also referred to as second information, and similarly the second information is also referred to as the first information. Depending on the context, for example, the term "if" used herein may be explained as "when" or "while", or "in response to . . . , it is determined that".

It should be understood that although steps are described in a numbered manner for ease of understanding in embodiments of the disclosure, these numbers do not represent an execution order of the steps, nor do they mean that the sequentially numbered steps must be performed together. It should be understood that, one or several steps among the multiple steps numbered in sequence may be performed independently to solve the corresponding technical problem and achieve the predetermined technical solution. Even though multiple steps are for example listed together in the drawings, it does not mean that these steps must be performed together; and the drawings for example list the steps together for ease of understanding.

FIG. 1 is a block diagram illustrating a communication system according to sonic embodiments of the disclosure. As illustrated in FIG. 1, the communication system may include a network side 12 and a terminal 13.

The network side 12 includes several network devices 120. The network device 120 may be a base station, which is a device deployed in an access network to provide a wireless communication function for a terminal. The base station may be a base station of a serving cell of the terminal 13 or a base station of a neighboring cell of the serving cell of the terminal 13. The base stations may include various forms of macro base stations, micro base stations, relay stations, access points, transmission reception points (TRPs), and the like. In systems using different wireless access technologies, names of devices with base station functions may be different. In 5G NR systems, it is called gNodeB or gNB. With the evolution of communication technologies, the name "base station" may be descriptive and will change. The network device 120 may also be a location management function (LMF) entity. In the Interne of Vehicles or device to device (D2D) communication, the network device may also be a vehicle-mounted device terminal or the terminal 13.

The terminal 13 may include various handheld devices, vehicle-mounted devices, wearable devices, and computing devices, with wireless communication functions, or other processing devices connected to wireless moderns, as well as various forms of user equipment (UE), mobile stations (MSs), terminals, Internet of Things (IoT) devices, Industrial Internet of Things (IIoT) devices, and the like. For the convenience of description, the devices mentioned above are collectively referred to as terminals. The network device 120 and the terminal 13 communicate with each other through a certain air interface technology, such as a Uu interface.

In embodiments of the disclosure, the network device 12 has one or more transmission reception points (TRPs), also known as transmission points, and each TRP has one or more antenna panels. Multiple TRPs can transmit data to or receive data from one terminal 13 at the same time.

The terminal 13 has at least one antenna panel, By adjusting parameters of the antenna panel, the direction of the transmit beam and/or the receive beam of the antenna panel can be changed. When the terminal 13 has at least two antenna panels, the terminal can transmit or receive beams simultaneously through different antenna panels.

The communication systems and service scenarios described in embodiments of the disclosure are for the purpose of illustrating the technical solutions of embodiments of the disclosure more clearly, and do not constitute a limit on the technical solutions provided of embodiments of the disclosure. With the evolution of communication systems and the emergence of service scenarios, the technical solutions provided in embodiments of the disclosure are also applicable to similar technical problems.

To facilitate the understanding of embodiments of the disclosure, some terms involved in the embodiments of the disclosure are first explained below MPE: regulated by regulatory agencies such as the Federal Communications Commission (FCC) and the International Commission on Non-Ionizing Radiation Protection (ICNIRP), and configured to limit radio frequency radiation from wireless devices. The MPE limit is typically imposed on wireless devices that communicate above 6 GHz. Since higher frequencies above 6 GHz interact with human skin surfaces, the MPE limit is a regulatory measure of area-based exposure. For example, for a millimeter-wave system, the MPE is limited to 1 $mW/cm^2$, which means that the power density experienced by the human body may not exceed 1 $mW/cm^2$. As another example, for a millimeter-wave system, the MPE is limited to 20 $mW/cm^2$.

Maximum permissible transmit power: the maximum transmit power of the terminal under the condition that the MPE limit is satisfied.

In some embodiments, the terminal may determine the maximum permissible transmit power based on the distance between the antenna panel of the terminal and the body part (e.g., hand) of the user. For example, under the same MPE limit, the closer the distance, the smaller the maximum permissible transmit power. In other embodiments, under the same MPE limit, the maximum permissible transmit power is a fixed value.

Maximum transmit power of the terminal: the maximum transmit power of the terminal when the MPE limit is not considered.

In some embodiments, the maximum transmit power of the terminal is the maximum transmit power configured by the network device, in other embodiments, the maximum transmit power of the terminal is the maximum transmit power that the terminal capability can support, Uplink beam: the beam transmitted by the terminal through the antenna panel, also known as the transmit beam. At the same time, one antenna panel can only transmit one uplink beam.

In some embodiments, one antenna panel of the terminal only transmits one uplink beam, that is, the direction of the transmitted uplink beam is fixed. In this case, the maximum permissible transmit power of the uplink beam of the antenna panel is determined, that is, the maximum permissible transmit power of the antenna panel, which can be considered that the maximum permissible transmit power may be determined in units of antenna panels.

In some embodiments, one antenna panel of the terminal can transmit multiple uplink beams with different directions. In this case, the maximum permissible transmit powers of the multiple uplink beams corresponding to the antenna panel are determined respectively. The permissible transmit powers of different uplink beams may be the same or different.

Figure 2:
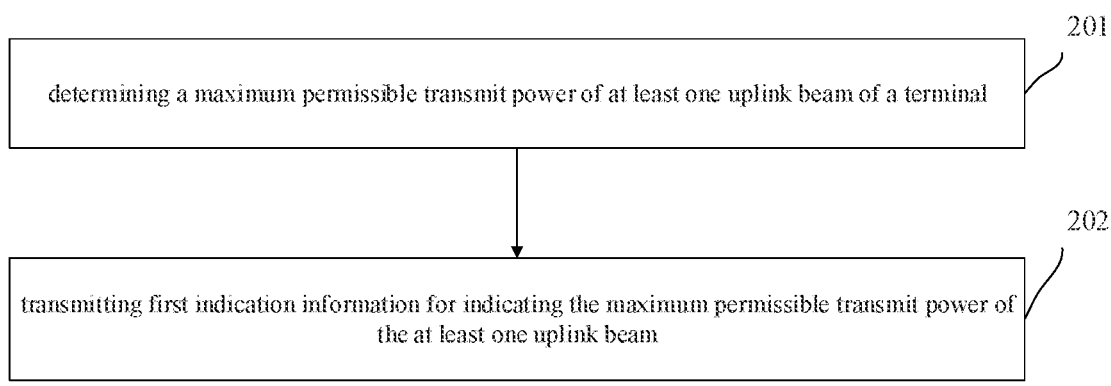
FIG. 2 is a flowchart illustrating a method for indicating a transmit power according to some embodiments.

FIG. 2 is a flowchart illustrating a method for indicating a transmit power according to some embodiments. The method can be performed by a terminal. Referring to FIG. 2, the method includes the following steps.

In step 201, a maximum permissible transmit power of at least one uplink beam of a terminal is determined.

The maximum permissible transmit power is a maximum transmit power subject to satisfying a MPE limit of the terminal.

In step 202, first indication information for indicating the maximum permissible transmit power of the at least one uplink beam is transmitted.

In a possible implementation manner, transmitting the first indication information for indicating the maximum permissible transmit power of the at least one uplink beam includes: transmitting the first indication information through uplink control information (UCI); or, transmitting the first indication information through message 3 in a 4-step random access procedure or message A in a 2-step random access procedure.

Optionally, the UCI includes a beam measurement result or a channel state information measurement result.

In a possible implementation manner, transmitting the first indication information for indicating the maximum permissible transmit power of the at least one uplink beam includes: transmitting the first indication information through an uplink power headroom report (PHR); or, transmitting the first indication information through an uplink power limit report, in which the -uplink power limit report is configured to indicate a power limit due to the MPE limit.

Optionally, transmitting the first indication information for indicating the maximum permissible transmit power of the at least one uplink beam includes: transmitting the first indication information through a physical uplink control channel (PUCCH) or a physical uplink shared channel (PUSCH).

Optionally, transmitting the first indication information for indicating the maximum permissible transmit power of the at least one uplink beam includes: transmitting the first indication information for indicating a maximum permissible transmit power of a first uplink beam, in which the first uplink beam is an uplink beam with the maximum permissible transmit power less than a maximum transmit power of the terminal, or, the first uplink beam is any uplink beam, or, the first uplink beam is an uplink beam with the maximum permissible transmit power not greater than the maximum transmit power of the terminal; in which the maximum transmit power of the terminal is a maximum transmit power corresponding to the first uplink beam and configured by a network device, or the maximum transmit power of the terminal is a maximum transmit power corresponding to the first uplink beam and supported by a capability of the terminal.

Optionally, the first indication information includes an identifier of the uplink beam and power-related information of the uplink beam, and the power-related information includes one or more of: the maximum permissible transmit power, a power interval to which the maximum permissible transmit power belongs, a level corresponding to the maximum permissible transmit power, or a difference between the maximum permissible transmit power and a maximum transmit power of the terminal, in which the maximum transmit power of the terminal is a maximum transmit power corresponding to the uplink beam and configured by a network device, or the maximum transmit power of the terminal is a maximum transmit power corresponding to the uplink beam and supported by a capability of the terminal.

Optionally, the identifier of the uplink beam includes a reference signal identifier, and the reference signal identifier includes at least one of: a synchronization signal block (SSB) ID, a channel state information reference signal (CSI-RS) ID, a positioning reference signal (PRS) ID, a tracking reference signal (TRS) ID, or a sounding reference signal (SRS) ID.

Optionally, determining the maximum permissible transmit power of the at least one uplink beam of the terminal includes: obtaining second indication information for indicating a maximum MPE value of the terminal; and determining the maximum permissible transmit power of the at least one uplink beam of the terminal based on the MPE value.

Optionally, obtaining the second indication information for indicating the maximum MPE value of the terminal includes: obtaining the second indication information stored by the terminal; or, receiving the second indication information transmitted by a network device.

Optionally, determining the maximum permissible transmit power of the at least one uplink beam of the terminal based on the MPE value includes: determining a first exposure amount brought by a first transmit power: determining a power difference between the first transmit power and the maximum permissible transmit power based on a difference between the first exposure amount and the MPE value; and determining the maximum permissible transmit power based on the power difference and the first transmit power; in which the first transmit power is a set value; or the first transmit power is determined based on configuration information transmitted by the network device.

Optionally; determining the maximum permissible transmit power of the at least one uplink beam of the terminal based on the MPE value includes: in response to an exposure amount brought by a transmit power of the uplink beam reaching the MPE value, using the transmit power as the maximum permissible transmit power of the uplink beam.

It should be noted that the foregoing steps 201 to 202 and the foregoing optional steps may be combined arbitrarily.

Figure 3:
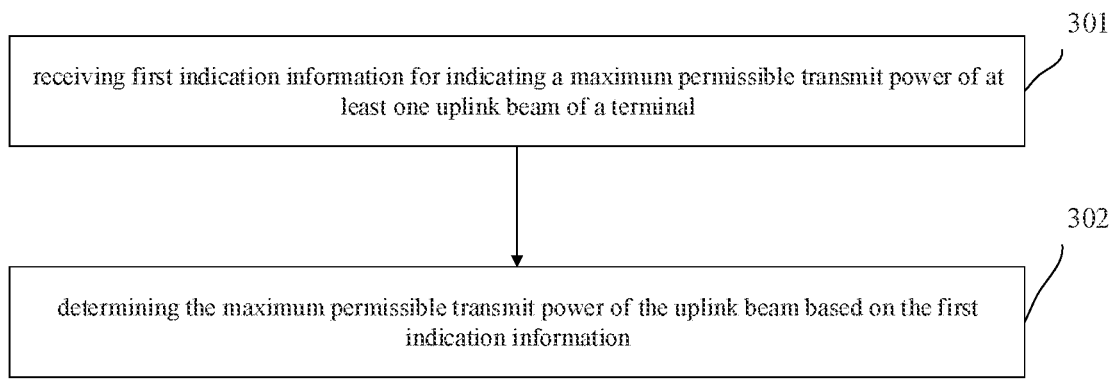
FIG. 3 is a flowchart illustrating a method for determining a transmit power according to some embodiments.

FIG. 3 is a flowchart illustrating a method for determining a transmit power according to some embodiments, The method can be performed by a network device. Referring to FIG. 3, the method includes the following steps, In step 301, first indication information for indicating a maximum permissible transmit power of at least one uplink beam of a terminal is received.

The maximum permissible transmit power is a maximum transmit power subject to satisfying a MPE limit of the terminal.

In step 302, the maximum permissible transmit power of the uplink beam is determined based on the first indication information.

In a possible implementation manner, receiving the first indication information for indicating the maximum permissible transmit power of the at least one uplink beam of the terminal includes: receiving the first indication information transmitted through UCI; or, receiving the first indication information transmitted through message 3 in a 4-step random access procedure or message A in a 2-step random access procedure.

Optionally, the UCI includes a beam measurement result or a channel state information measurement result.

In a possible implementation manner, receiving the first indication information for indicating the maximum permissible transmit power of the at least one uplink beam of the terminal includes: receiving the first indication information transmitted through an uplink PHR; or, receiving the first indication information transmitted through an uplink power limit report, in which the uplink power limit report is configured to indicate a power limit due to the MPE limit.

Optionally, the first indication information is received through a PUCCH or a PUSCH.

Optionally, receiving the first indication information for indicating the maximum permissible transmit power of the at least one uplink beam of the terminal includes: receiving the first indication information for indicating a maximum permissible transmit power of a first uplink beam, in which the first uplink beam is an uplink beam with the maximum permissible transmit power less than a maximum transmit power of the terminal, or, the first uplink beam is any uplink beam, or, the first uplink beam is an uplink beam with the maximum permissible transmit power not greater than the maximum transmit power of the terminal. The maximum transmit power of the terminal is a maximum transmit power corresponding to the first uplink beam and configured by a network device, or the maximum transmit power of the terminal is a maximum transmit power corresponding to the first uplink beam and supported by a capability of the terminal.

Optionally, the first indication information includes an identifier of the uplink beam and power-related information of the uplink beam, and the power-related information includes one or more of the maximum permissible transmit power, a power interval to which the maximum permissible transmit power belongs, a level corresponding to the maximum permissible transmit power, or a difference between the maximum permissible transmit power and a maximum transmit power of the terminal, in which the maximum transmit power of the terminal is a maximum transmit power corresponding to the uplink beam and configured by a network device, or the maximum transmit power of the terminal is a maximum transmit power corresponding to the uplink beam and supported by a capability of the terminal.

Optionally, the identifier of the uplink beam includes a reference signal identifier, and the reference signal identifier includes at least one of: an SSB ID, a CSI-RS a PRS ID, a TRS ID, or an SRS ID.

It should be noted that the foregoing steps 301 to 302 and the foregoing optional steps may be combined arbitrarily.

Figure 4:
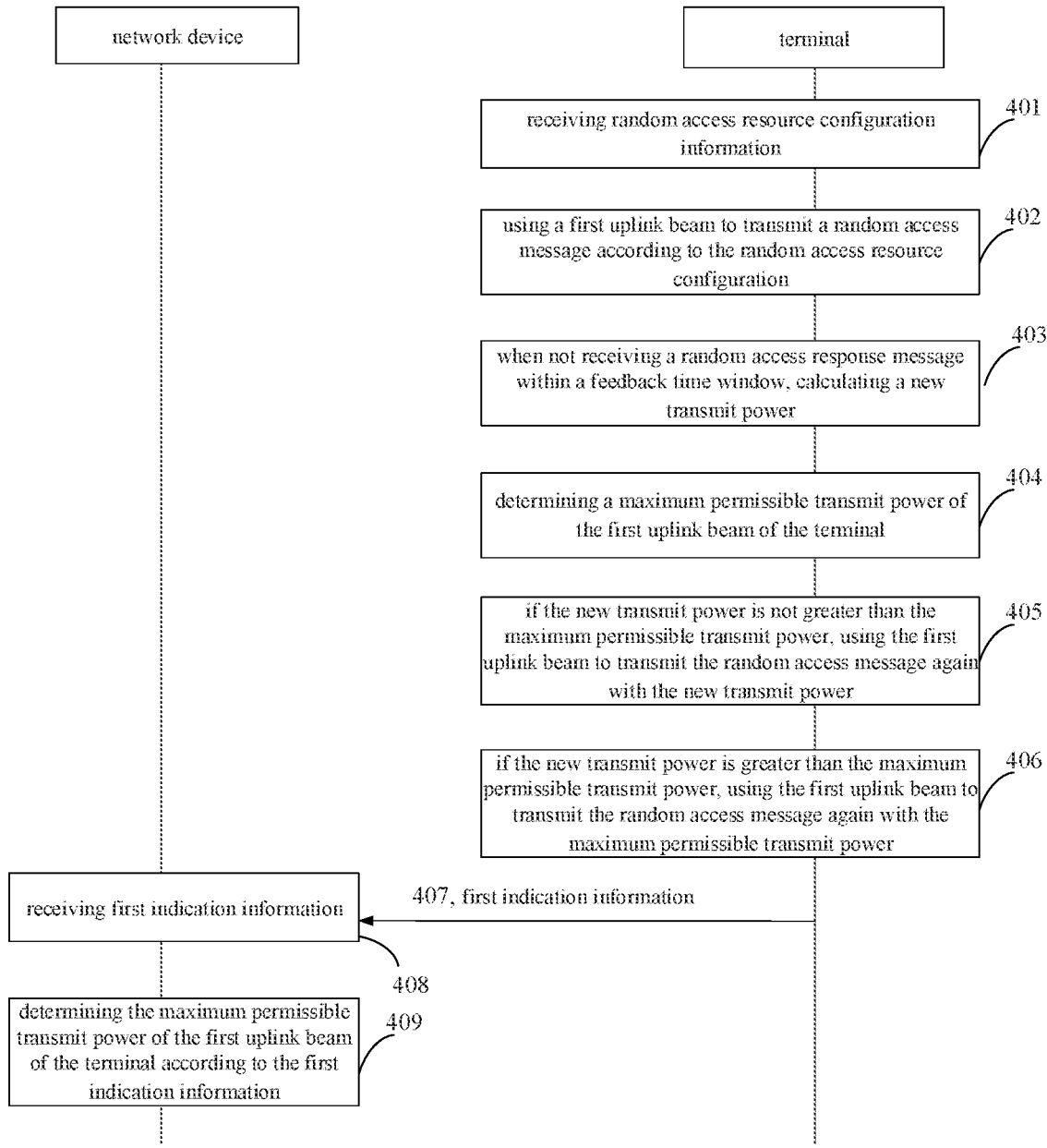
FIG. 4 is a flowchart illustrating a method for indicating and determining a transmit power according to some embodiments.

FIG. 4 is a flowchart illustrating a method for indicating and determining a transmit power according to sonic embodiments. The method can be performed jointly by the network device and the terminal. In embodiments shown in FIG. 4, the terminal transmits a random access message through an uplink beam, and accordingly, the terminal transmits first indication information for indicating a maximum permissible transmit power of at least one uplink beam, through a PUSCH in the random access procedure, to the network device. Referring to FIG. 4, the method includes the following steps.

In step 401, the terminal receives random access resource configuration information.

The random access resource configuration information includes location information and uplink transmit power information of the random access resource. The random access resource includes at least one of: a time domain resource, a frequency domain resource, or a random access preamble resource. The uplink transmit power information includes an initial transmit power and a power increasing granularity.

The terminal receives an SSB and obtains the random access resource configuration information according to the received SSB.

Each SSB can correspond to an optimal receive beam.

In step 402, the terminal uses a first uplink beam to transmit a random access message according to the random access resource configuration.

The first uplink beam may be an uplink beam corresponding to a receive beam with a reference signal receiving power (RSRP) higher than a threshold. The RSRP of the receive beam is obtained by measuring the SSB.

In step 403, when the terminal does not receive a random access response message within a feedback time window, the terminal calculates a new transmit power.

In some embodiments, the new transmit power is equal to a sum of the last transmit power and the power increasing granularity, For example, if the random response message is not received within the time window after the random access message is transmitted for the first time, the new transmit power is equal to the sum of the initial transmit power and the power increasing granularity. If the random response message is not received within the time window after the random access message is transmitted for the third time, the new transmit power is equal to the sum of the transmit power used in the second transmission and the power increasing granularity, that is, the sum of the initial transmit power and 2 times the power increasing granularity, and so on.

It should be noted that, if the calculated new transmit power exceeds the maximum transmit power of the terminal, the maximum transmit power of the terminal is taken as the new transmit power. The maximum transmit power of the terminal is the maximum transmit power corresponding to the first uplink beam which is configured by the network device, or the maximum transmit power of the terminal is the maximum transmit power corresponding to the first uplink beam which the terminal capability can support.

In step 404, the terminal determines a maximum permissible transmit power of the first uplink beam of the terminal, in which the maximum permissible transmit power is a maximum transmit power subject to satisfying a MPE limit of the terminal.

In step 405, if the new transmit power is not greater than the maximum permissible transmit power, the first uplink beam is used to transmit the random access message again with the new transmit power.

In step 406, if the new transmit power is greater than the maximum permissible transmit power, the first uplink beam is used to transmit the random access message again with the maximum permissible transmit power.

In other embodiments, step 406 may be replaced by: reselecting a second uplink beam to transmit the random access message according to the random access resource configuration. That is, the random access message is no longer transmitted using the first uplink beam.

In step 407, the terminal transmits the first indication information for indicating the maximum permissible transmit power of the first uplink beam.

For example, the first indication information includes an identifier of the uplink beam and power-related information of the uplink beam, and the power-related information includes one or more of: the maximum permissible transmit power, a power interval to which the maximum permissible transmit power belongs, a level corresponding to the maximum permissible transmit power, or a difference between the maximum permissible transmit power and the maximum transmit power of the terminal, in which the maximum transmit power of the terminal is the maximum transmit power corresponding to the first uplink beam and configured by the network device, or the maximum transmit power of the terminal is the maximum transmit power corresponding to the first uplink beam and supported by a capability of the terminal.

Optionally, the identifier of the uplink beam includes a reference signal identifier, and the reference signal identifier includes at least one of: an SSB ID, a CSI-RS ID, a PRS ID. a TRS ID, or an SRS ID. Further, the reference signal identifier also includes a TRP identifier and/or a physical cell identifier corresponding to the reference signal.

In a possible implementation manner, the terminal uses a 4-step random access procedure to perform random access, and the random access message is message 1 (msg.1) in the 4-step random access procedure. In this case, if it is determined that the maximum permissible transmit power of the first uplink beam is less than the maximum transmit power of the terminal, that is, the maximum permissible transmit power limits the maximum transmit power of the uplink beam of the terminal, the terminal will receive the random access response message, that is, message 2 (msg.2), and the -first indication information is transmitted through message 3 (msg.3).

In another possible implementation manner, the terminal uses a 2-step random access procedure to perform random access, and the random access message is message A (msg.A) in the 2-step random access procedure, and the terminal uses the PUSCH in msg.A to transmit the first indication information.

In step 408, the network device receives the first indication information.

In step 409, the network device determines the maximum permissible transmit power of the first uplink beam of the terminal according to the first indication information.

In the subsequent communication process, the network device may perform resource scheduling according to the maximum permissible transmit power of the first uplink beam. For example, the terminal is preferentially instructed to use a beam with a higher maximum permissible transmit power for uplink transmission, and so on.

It should be noted that, in embodiments shown in FIG. 4, when the determined transmit power is greater than the maximum permissible transmit power, the terminal performs step 407, that is, only transmits the first indication information corresponding to the uplink beam whose maximum permissible transmit power is less than the maximum transmit power of the terminal. In other embodiments, regardless of whether the transmit power determined by the terminal is greater than the maximum permissible transmit power, step 407 is performed, that is, the first indication information corresponding to all uplink beams is transmitted.

In embodiments of the disclosure, the maximum permissible transmit power of the uplink beam of the terminal is the maximum transmit power under the condition that the MPE limit of the terminal is satisfied, and the first indication information for indicating the maximum transmit power of the at least one uplink beam is transmitted to the network device, so that the network device can determine the maximum transmit power that can be achieved by the corresponding uplink beam of the terminal according to the first indication information, and perform resource scheduling according to the maximum transmit power, thereby improving the uplink transmission performance of the terminal.

Figure 5:
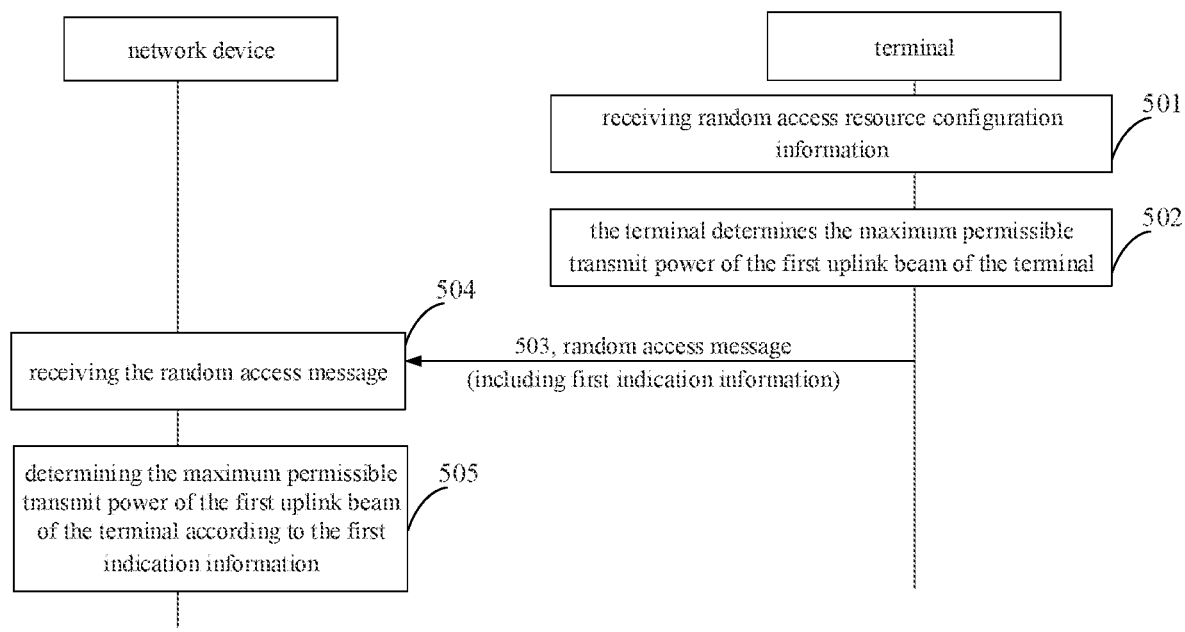
FIG. 5 is a flowchart illustrating a method for indicating and determining a transmit power according to sonic embodiments.

FIG. 5 is a flowchart illustrating a method for indicating and determining a. transmit power according to some embodiments. The method is performed jointly by the terminal and the network device. The difference between this method and the method shown in FIG. 4 is that, in embodiments shown in FIG. 4, when the transmit power of the first uplink beam of the terminal is about to exceed the corresponding maximum permissible transmit power, the maximum permissible transmit power is transmitted in the random access message, but in embodiments shown in FIG. 5, when it is determined that the maximum permissible transmit power of the first uplink beam of the terminal is less than the maximum transmit power of the terminal, the maximum permissible transmit power is transmitted in the random access message.

As shown in FIG. 5, the method includes the following steps.

In step 501, the terminal receives random access resource configuration information.

For the relevant content, reference should be made to step 401, and the detailed description is omitted herein.

In step 502, the terminal determines the maximum permissible transmit power of the first uplink beam of the terminal.

The maximum permissible transmit power is the maximum transmit power subject to satisfying the MPE limit of the terminal, The first uplink beam is an uplink beam used for transmitting random access messages. The first uplink beam may he an uplink beam corresponding to a receive beam whose RSRP is higher than a threshold. The RSRP of the receive beam is obtained by measuring the SSB.

In step 503, the terminal uses the first uplink beam to transmit the random access message according to the random access resource configuration.

If the maximum permissible transmit power of the first uplink beam of the terminal is less than the maximum transmit power of the terminal, the random access message includes the first indication information.

For example, when the terminal uses the 2-step random access procedure to perform random access, the random access message is message A (msg.A) in the 2-step random access procedure, and the terminal transmits the first indication information through the PUSCH in msg.A, In step 504, the network device receives the random access message.

After receiving the random access message, the network device obtains the first indication information in the random access message.

In step 505, the network device determines the maximum permissible transmit power of the first uplink beam of the terminal according to the first indication information.

It should be noted that, in embodiments shown in FIG. 5, the terminal transmits the first indication information only when the maximum permissible transmit power of the first uplink beam is less than the maximum transmit power of the terminal. In other embodiments, whether the maximum permissible transmit power of the uplink beam is less than the maximum transmit power of the terminal, the first indication information is transmitted, that is, for any uplink beam, the first indication information is transmitted.

Figure 6:
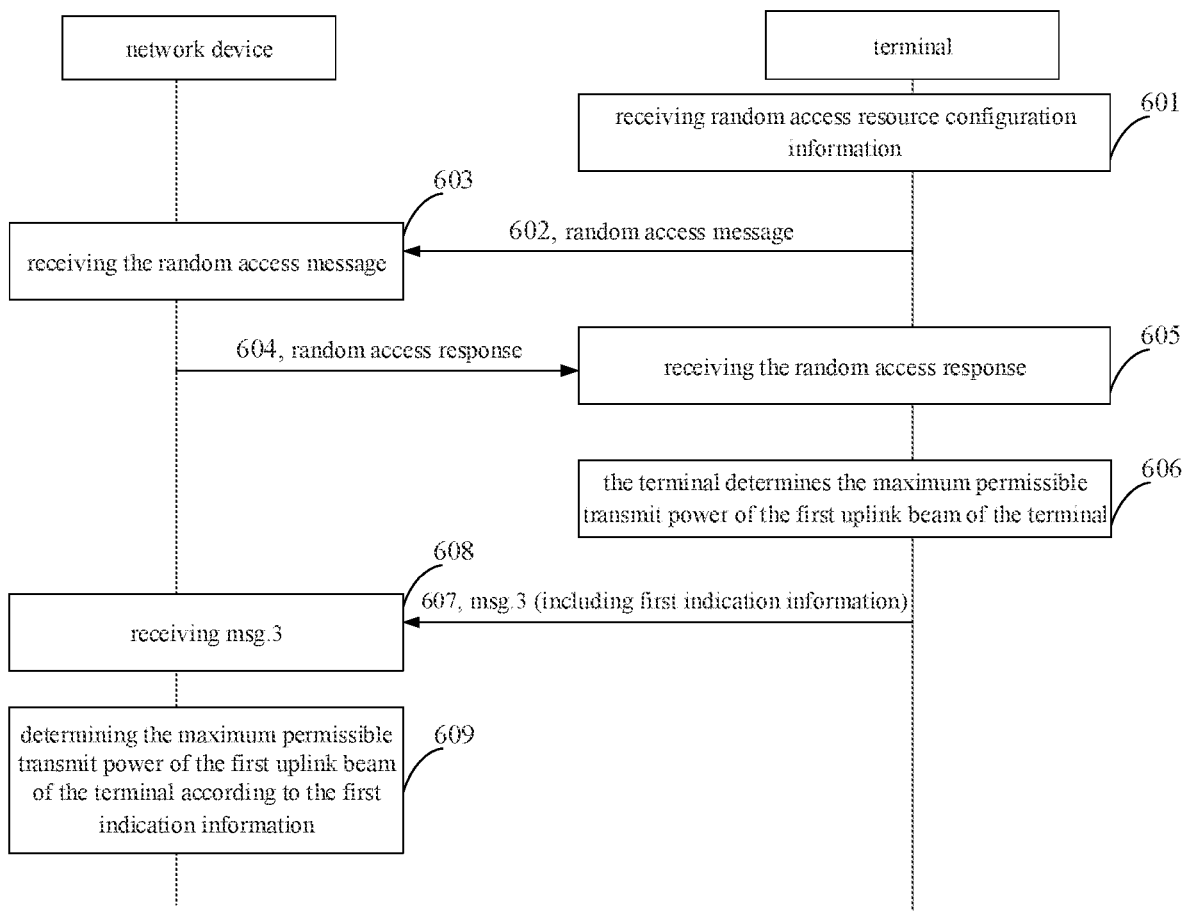
FIG. 6 is a flowchart illustrating a method for indicating and determining a transmit power according to sonic embodiments.

FIG. 6 is a flowchart illustrating a method for indicating and determining a transmit power according to some embodiments. The method is performed jointly by the terminal and the network device. The difference between this method and embodiments shown in FIG. 5 is that, embodiments shown in FIG. 5 are directed to the 2-step random access procedure, and embodiments shown in FIG. 6 are directed to the 4-step random access procedure.

As shown in FIG. 6, the method includes the following steps.

In step 601, the terminal receives random access resource configuration information.

For the relevant content, reference should be made to step 401, and the detailed description is omitted herein.

In step 602, the terminal uses the first uplink beam to transmit the random access message according to the random access resource configuration.

The first uplink beam may be an uplink beam corresponding to a receive beam whose RSRP is higher than a threshold. The RSRP of the receive beam is obtained by measuring the SSB.

For example, the random access message is message 1 (msg.1.) in the 4-step random access procedure.

In step 603, the network device receives the random access message.

In step 604, the network device transmits the random access response.

The random access response is msg.2 in the 4-step random access procedure.

In step 605, the terminal receives the random access response.

In step 606, the terminal determines the maximum permissible transmit power of the first uplink beam of the terminal.

The maximum permissible transmit power is the maximum transmit power subject to satisfying the MPE limit of the terminal.

It should be noted that, step 606 may be performed simultaneously with any one of steps 602 to 605, or performed between any two adjacent steps among steps 602 to 605.

In step 607, the terminal transmits msg.3.

If the maximum permissible transmit power of the first uplink beam of the terminal is less than the maximum transmit power of the terminal, msg.3 includes the first indication information.

In step 608, the network device receives msg.3.

After receiving msg.3, the network device obtains the first indication information in msg.3.

In step 609, the network device determines the maximum permissible transmit power of the first uplink beam of the terminal according to the first indication information.

It should be noted that, in embodiments shown in FIG. 6, the terminal transmits the first indication information only when the maximum permissible transmit power of the first uplink beam is less than the maximum transmit power of the terminal. In other embodiments, whether the maximum permissible transmit power of the uplink beam is less than the maximum transmit power of the terminal, the first indication information is transmitted, that is, for any uplink beam, the first indication information is transmitted.

In some embodiments, the network device transmits a downlink reference signal for beam measurement, and the terminal receives the downlink reference signal, performs beam measurement, and transmits a beam measurement result. In this case, the terminal may transmit the first indication information and the beam measurement result through a beam measurement report.

Figure 7:
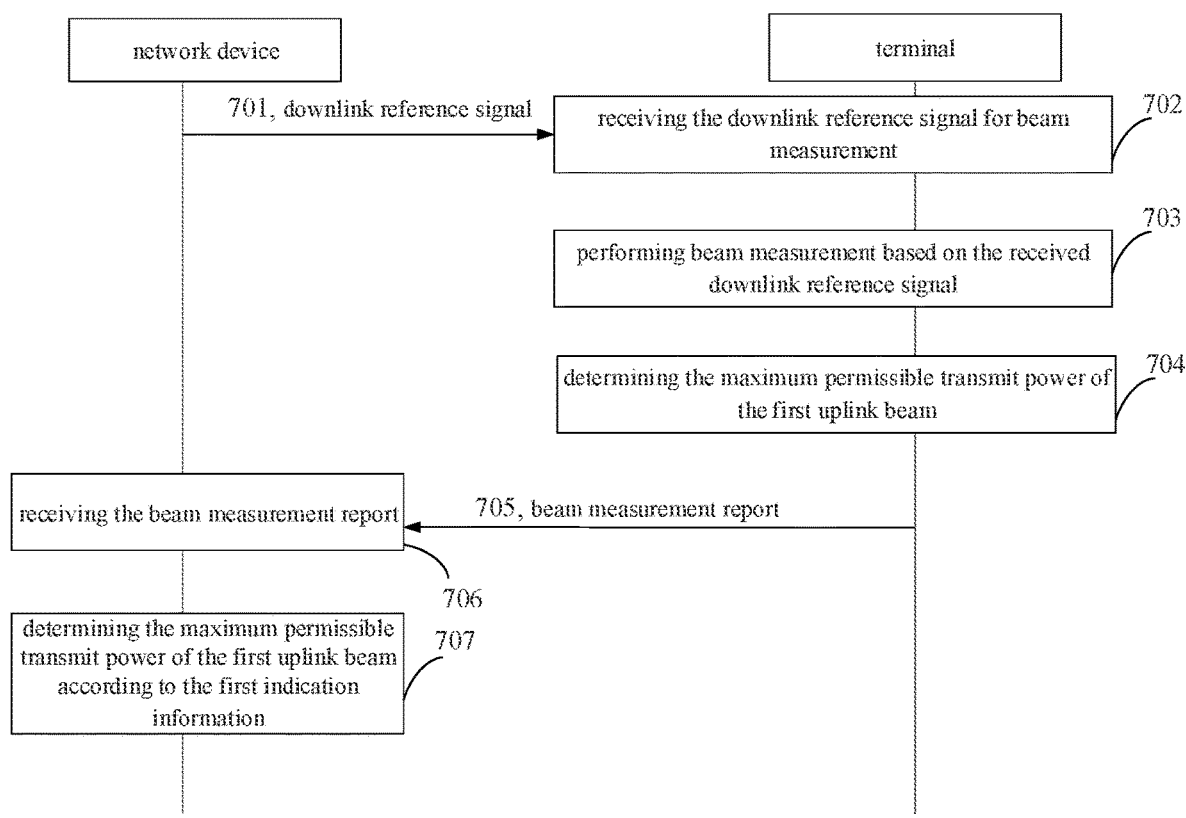
FIG. 7 is a flowchart illustrating a method for indicating and determining a transmit power according to some embodiments.

FIG. 7 is a flowchart illustrating a method for indicating and determining a transmit power according to some embodiments, The method is performed jointly by the terminal and the network device. As shown in FIG. 7, the method includes the following steps.

In step 701, the network device transmits a downlink reference signal for beam measurement.

The downlink reference signal used for beam measurement includes but is not limited to an SSB, a CSI-RS, or a PRS.

In step 702, the terminal receives the downlink reference signal for beam measurement.

In step 703, the terminal performs beam measurement based on the received downlink reference signal.

By performing beam measurement on the downlink reference signal, a measurement value corresponding to each downlink reference signal is obtained. For example, the measurement value includes at least one of: a reference signal received power (L1-RSRP) or a signal to interference plus noise ratio (L1-SINR).

In step 704, the terminal determines the maximum permissible transmit power of the first uplink beam, in which the maximum permissible transmit power is the maximum transmit power subject to satisfying the MPE limit of the terminal.

In step 705, the terminal transmits a beam measurement report.

The beam measurement report includes the beam measurement result obtained in step 703 and the first indication information.

Optionally, the manner in which the terminal transmits the beam measurement report includes but is not limited to periodic reporting, semi-static reporting, or aperiodic reporting. Optionally, the beam measurement report can he transmitted through the UCI, and the UCI can be reported through the PUCCH or the PUSCH.

Optionally, the manner of transmitting the beam measurement report is indicated by the network device, for example, indicated by the network device through a combination of one or more of: a radio resource control (RRC) signaling, a medium access control (MAC) signaling, or a downlink control information signaling.

For the relevant content of the first indication information, reference should be made to the foregoing step 407, and the detailed description is omitted herein.

In step 706, the network device receives the beam measurement report.

In step 707, the network device determines the maximum permissible transmit power of the first uplink beam according to the first indication information.

In some embodiments, the network device transmits a downlink reference signal for channel state information measurement, and the terminal receives the downlink reference signal, performs channel state information measurement, and transmits a channel state information measurement result. In this case, the terminal may transmit the first indication information and the channel state information measurement result through the channel state information report.

Figure 8:
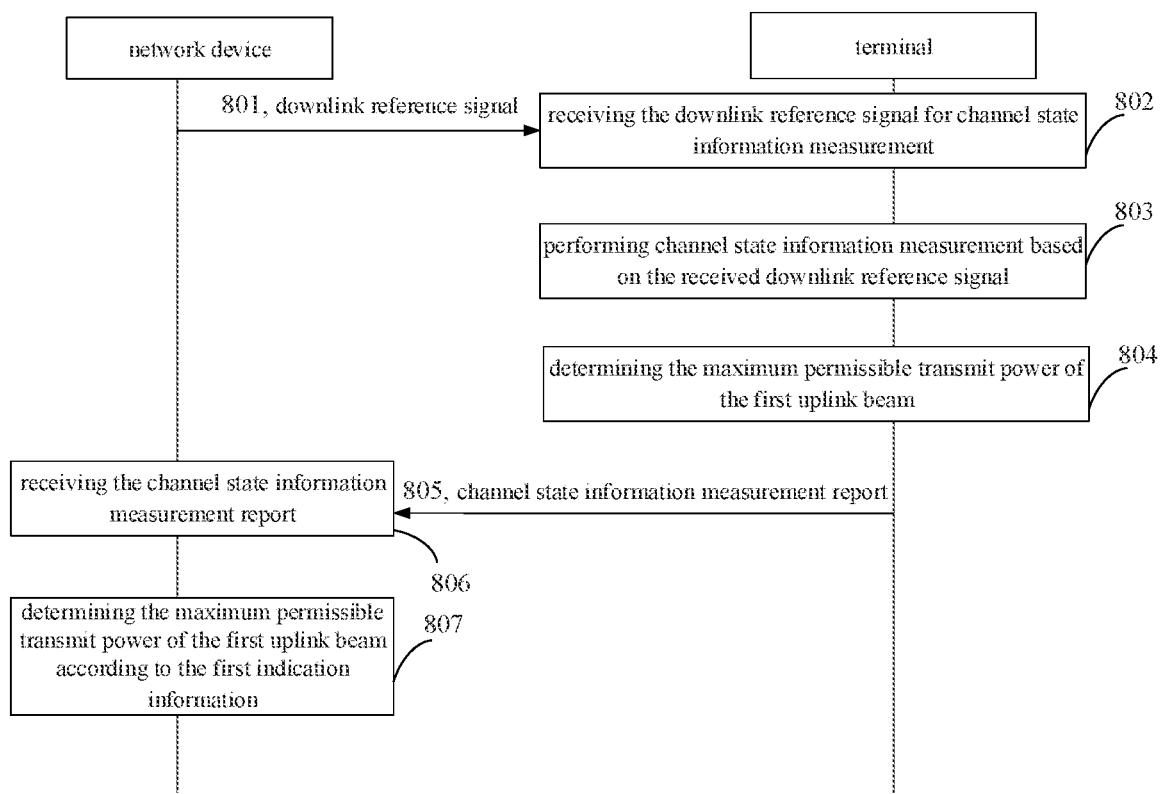
FIG. 8 is a flowchart illustrating a method for indicating and determining a transmit power according to some embodiments.

FIG. 8 is a flowchart illustrating a method for indicating and determining a. transmit power according to some embodiments. The method is performed jointly by the terminal and the network device. As shown in FIG. 8, the method includes the following the steps.

In step 801, the network device transmits a downlink reference signal for channel state information measurement.

For example, the downlink reference signal used for channel state information measurement includes but is not limited to an SSB, a CSI-RS, or a PRS.

In step 802, the terminal receives the downlink reference signal for channel state information measurement.

In step 803, the terminal performs channel state information measurement based on the received downlink reference signal.

By performing channel state information measurement on the downlink reference signal, a measurement value corresponding to each downlink reference signal is obtained. For example, the measurement value includes a channel quality indicator (CQI).

In step 804, the terminal determines the maximum permissible transmit power of the first uplink beam, in which the maximum permissible transmit power is the maximum transmit power subject to satisfying the MPE limit of the terminal.

In step 805, the terminal transmits a channel state information measurement report.

The channel state information measurement report includes the channel state information measurement result obtained in step 803 and the first indication information.

For the relevant content of the first indication information, reference should be made to the foregoing step 407, and the detailed description is omitted herein.

Optionally, the channel state information measurement report further includes information such as a rank indication (RI), a precoding matrix indicator (PMI).

Optionally, the manner in which the terminal transmits the channel state information measurement report includes, but is not limited to, periodic reporting, semi-static reporting, or aperiodic reporting. Optionally, the channel state information measurement report can be transmitted through the UCI, and the UCI can be reported through the PUCCH or the PUSCH.

Optionally, the manner of transmitting the channel state information measurement report is indicated by the network device, for example, indicated by the network device through a combination of one or more of: a RRC signaling, a MAC signaling, or a DCI signaling.

In step 806, the network device receives the channel state information measurement report.

In step 807, the network device determines the maximum permissible transmit power of the first uplink beam according to the first indication information.

In some embodiments, the terminal transmits an uplink reference signal through the first uplink beam, and the network device receives the uplink reference signal, and performs beam measurement and/or channel state information measurement and/or positioning measurement based on the uplink reference signal. In this case, the terminal can transmit the first indication information through the beam measurement report (that is, transmit the first indication information together with the beam measurement result), or transmit the first indication information through the channel state information measurement report (that is, transmit the first indication information together with the channel state information measurement result), or the first indication information is transmitted through a dedicated signaling.

Figure 9:
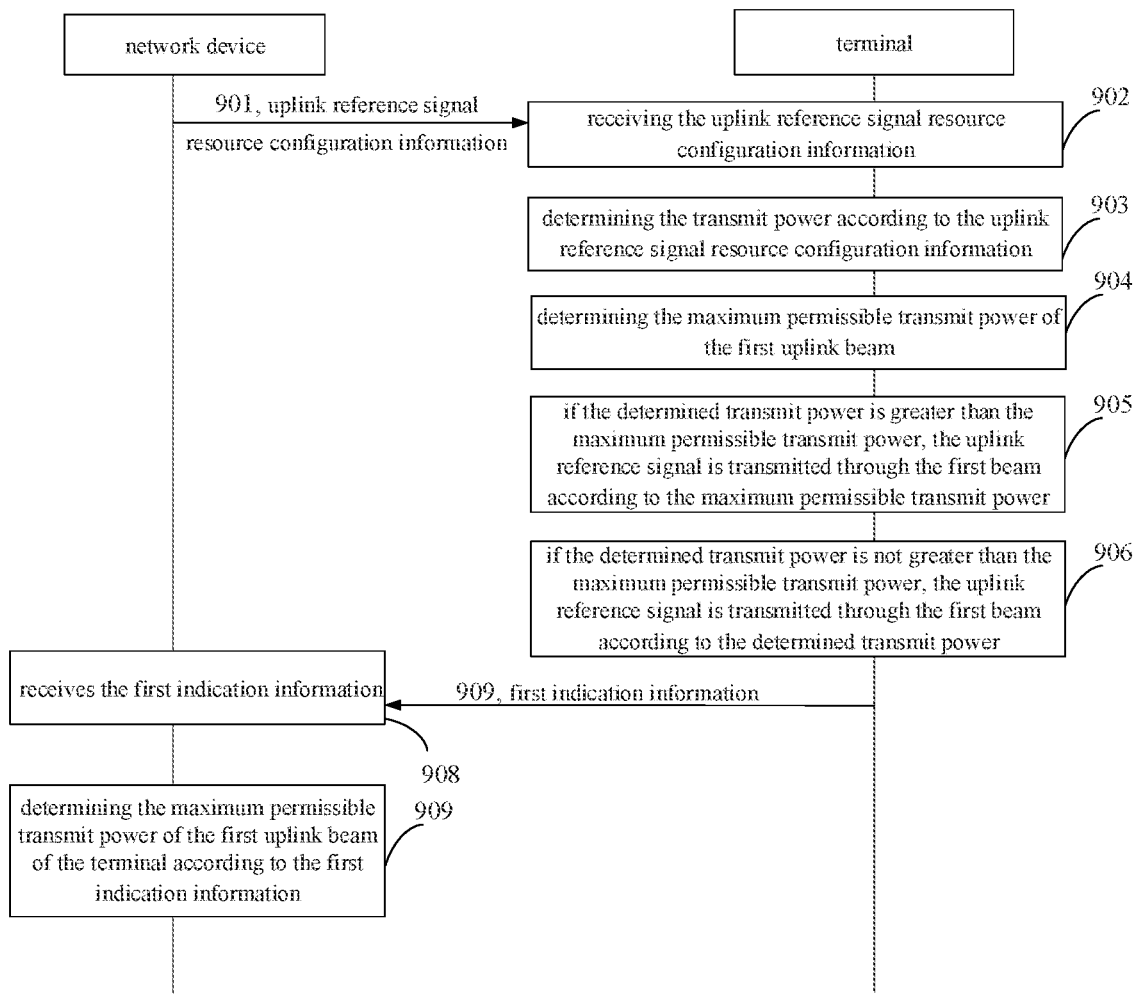
FIG. 9 is a flowchart illustrating a method for indicating and determining a transmit power according to some embodiments.

FIG. 9 is a flowchart illustrating a method for indicating and determining a transmit power according to some embodiments. The method is performed jointly by the terminal and the network device. As shown in FIG. 9, the method includes the following steps.

In step 901, the network device transmits uplink reference signal resource configuration information.

The reference signal configuration information is configured to indicate a resource used to bear an uplink reference signal. For example, the uplink reference signal is an SRS.

Optionally, the SRS is an SRS used for uplink beam management, or an SRS used for channel state information measurement, or an SRS used for positioning measurement.

Optionally, the uplink reference signal resource configuration information includes location information of the uplink resource and uplink transmit power related information. The location information of the uplink resource includes at least one of: location information of a time domain resource or location information of a frequency domain resource. For example, the uplink transmit power information includes an initial transmit power and a power increasing granularity.

In step 902, the terminal receives the uplink reference signal resource configuration information In step 903, the terminal determines the transmit power according to the uplink reference signal resource configuration information.

The terminal determines the transmit power according to the uplink transmit power related information. For the determination manner, reference may be made to the foregoing step 403, and the detailed description is omitted herein.

In step 904, the terminal determines the maximum permissible transmit power of the first uplink beam.

The maximum permissible transmit power is the maximum transmit power subject to satisfying the MPE limit of the terminal. The first uplink beam is an uplink beam used for transmitting the uplink reference signal.

In step 905, if the determined transmit power is greater than the maximum permissible transmit power, the uplink reference signal is transmitted through the first beam according to the maximum permissible transmit power.

In step 906, if the determined transmit power is not greater than the maximum permissible transmit power, the uplink reference signal is transmitted through the first beam according to the determined transmit power.

In step 907, the terminal transmits the first indication information for indicating the maximum permissible transmit power of the first uplink beam.

For the relevant content of the first indication information, reference should be made to the foregoing step 407, and the detailed description is omitted herein.

During step 907, the terminal determines the receive beam corresponding to the first uplink beam, and determines the identifier of the downlink reference signal corresponding to the receive beam, and the determined identifier of the downlink reference signal is used as the identifier of the first uplink beam. Or the terminal determines the identifier of the uplink reference signal corresponding to the first uplink beam, and the determined identifier of the uplink reference signal is used as the identifier of the uplink beam.

Optionally, the identifier of the downlink reference signal includes at least one of: a SSB ID, a CSI-RS ID, a PRS ID, or IRS ID, and the identifier of the uplink reference signal includes an SRS In some embodiments, the first indication information may be transmitted together with the next downlink beam measurement result. For the relevant content, reference may be made to the foregoing step 705, and the detailed description is omitted herein.

In some embodiments, the first indication information may be transmitted together with the next channel state information measurement result. For the relevant content, reference may be made to the foregoing step 805, and the detailed description is omitted herein.

In other embodiments, the first indication information may be transmitted through the dedicated signaling. The dedicated signaling can be carried through the PUCCH or the PUSCH.

In some embodiments, the terminal performs step 907 when the determined transmit power is greater than the maximum permissible transmit power. In other embodiments, the terminal performs step 907 regardless of whether the transmit power determined by the terminal is greater than the maximum permissible transmit power.

In step 908, the network device receives the first indication information.

In step 909, the network device determines the maximum permissible transmit power of the first uplink beam of the terminal according to the first indication information, Alternatively, in addition to the beam measurement report and the channel state information measurement report, the first indication information may also be transmitted through the uplink power headroom report. That is, in addition to indicating the power headroom between the current transmit power of the terminal used for PUSCH transmission and the maximum transmit power of the terminal, the uplink power headroom report also includes the first indication information. If the power headroom is positive, it means that the terminal can use the higher power than the current transmit power to transmit more information, and if the power headroom is negative, it means that the terminal has exceeded the permissible limit. The network device may allocate uplink resources for the terminal based on the power headroom. For example, the larger the power headroom, the more uplink resources are allocated to the terminal, such as the greater the number of resource blocks (RBs). The uplink power headroom report can be transmitted through the PUCCH or the PUSCH.

Alternatively, in addition to the beam measurement report and the channel state information measurement report, the first indication information may also be transmitted through the uplink power limit report, in which the uplink power limit report is configured to indicate the power limit due to the MPE limit. The uplink power limit report may be a newly defined report, which may be transmitted through a MAC control element (MAC CE) or UCI, and transmitted through the PUCCH or the PUSCH.

In any of the foregoing embodiments, the terminal may determine the maximum permissible transmit power of the first uplink beam in the following manner: obtaining second indication information for indicating a maximum MPE value of the terminal; and determining the maximum permissible transmit power of the at least one uplink beam of the terminal based on the MPE value.

Optionally, obtaining the second indication information for indicating the maximum MPE value of the terminal includes: obtaining the second indication information stored by the terminal; or, receiving the second indication information transmitted by a network device.

For example, the second indication information may be the MPE value, or an index corresponding to the MPE value, or an interval to which the MPE value belongs, etc., as long as the MPE value can be determined according to the second indication information.

Optionally, determining the maximum permissible transmit power of the at least one uplink beam of the terminal based on the MPE value includes: the first step is to determine a first exposure amount brought by a first transmit power; the second step is to determine a power difference between the first transmit power and the maximum permissible transmit power based on a difference between the first exposure amount and the MPE value; and the third step is to determine the maximum permissible transmit power based on the power difference and the first transmit power.

The first transmit power is a set value, or the first transmit power is determined based on configuration information transmitted by a network device.

For example, the sum of the power difference and the first transmit power is used as the maximum permissible transmit power.

Optionally, determining the maximum permissible transmit power of the at least one uplink beam of the terminal based on the MPE value includes: in response to an exposure amount brought by a transmit power of the uplink beam reaching the MPE value, using the transmit power as the maximum permissible transmit power of the uplink beam, Here, the exposure amount brought by the transmit power of the uplink beam reaches the MPE value, which means that the difference between the exposure amount brought by the transmit power of the uplink beam and the MPE value is sufficiently small, for example, about 0.

In a possible implementation manner, the second indication information may also be a transmit power threshold corresponding to the MPE value. In this embodiment, the transmit power threshold can be directly used as the maximum permissible transmit power.

Figure 10:
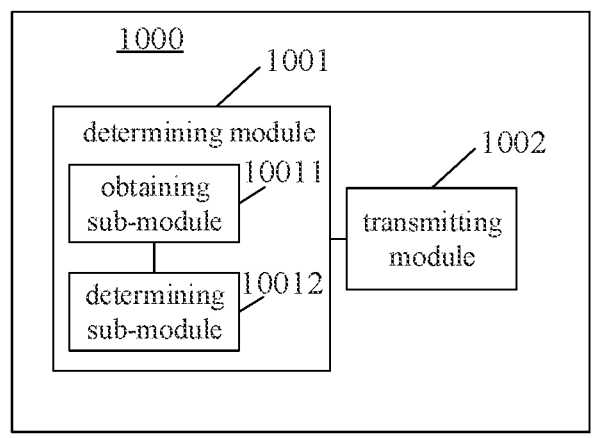
FIG. 10 is a block diagram of an apparatus for indicating a transmit power according to some embodiments.

FIG. 10 is a block diagram of an apparatus for indicating a transmit power according to some embodiments. The apparatus has the function of realizing the terminal in the above method embodiments, and the function may be realized by hardware or by executing corresponding software in hardware. As shown in FIG. 10, the apparatus 1000 includes a determining module 1001 and a transmitting module 1002.

The determining module 1001 is configured to determine a maximum permissible transmit power of at least one uplink beam of a terminal, in which the maximum permissible transmit power is a maximum transmit power subject to satisfying a MPE limit of a terminal. The transmitting module 1002 is configured to transmit first indication information for indicating the maximum permissible transmit power of the at least one uplink beam, In a possible implementation, the transmitting module 1002 is configured to: transmit the first indication information through UCI; or, transmit the first indication information transmitted message 3 in a 4-step random access procedure or message A in a 2-step random access procedure.

Optionally, the UCI further includes a beam measurement result or a channel state information measurement result.

In a possible implementation, the transmitting module 1002 is configured to: transmit the first indication information through an uplink PHIS; or, transmit the first indication information through an uplink power limit report, in which the uplink power limit report is configured to indicate a power limit due to the MPE limit.

Optionally, the transmitting module 1002 is configured to transmit the first indication information through a PUCCH or a PUSCH.

Optionally, the transmitting module 1002 is configured to transmit the first indication information for indicating a maximum permissible transmit power of a first uplink beam, in which the first uplink beam is an uplink beam with the maximum permissible transmit power less than a maximum transmit power of the terminal; or, the first uplink beam is any uplink beam, or, the first uplink beam is an uplink beam with the maximum permissible transmit power not greater than the maximum transmit power of the terminal; the maximum transmit power of the terminal is a maximum transmit power corresponding to the first uplink beam and configured by a network device, or the maximum transmit power of the terminal is a maximum transmit power corresponding to the first uplink beam and supported by a capability of the terminal.

Optionally, the determining module 1001 includes: an obtaining sub-module 10011, configured to obtain second indication information for indicating a maximum MPE value of the terminal; and a determining sub-module 10012, configured to determine the maximum permissible transmit power of the at least one uplink beam of the terminal based on the MPE value.

Optionally, the obtaining sub-module 10011 is configured to obtain the second indication information stored by the terminal; or, receive the second indication information transmitted by the network device.

Optionally; the determining sub-module 10012 is configured to determine a first exposure amount brought by a first transmit power; determine a power difference between the first transmit power and the maximum permissible transmit power based on a difference between the first exposure amount and the MPE value; and determine the maximum permissible transmit power based on the power difference and the first transmit power; in which the first transmit power is a set value, or the first transmit power is determined based on configuration information transmitted by a network device.

Optionally, the determining sub-module 10012 is configured to, in response to an exposure amount brought by a transmit power of the uplink beam reaching the MPE value, use the transmit power as the maximum permissible transmit power of the uplink beam.

Figure 11:
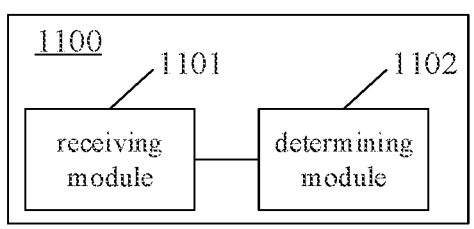
FIG. 11 is a block diagram of an apparatus for determining a transmit power according to some embodiments.

FIG. 11 is a block diagram of an apparatus for determining a transmit power according to some embodiments. The apparatus has the function of realizing the network device in the above method embodiments, and the function may be realized by hardware or by executing corresponding software in hardware. As shown in FIG. 11, the apparatus 1100 includes: a receiving module 1101 and a determining module 1102, The receiving module 1101 is configured to receive first indication information for indicating a maximum permissible transmit power of at least one uplink beam of a terminal, in which the maximum permissible transmit power is a maximum transmit power subject to satisfying a MPE limit of the terminal. The determining module 1102 is configured to determine the maximum permissible transmit power of the uplink beam based on the first indication information.

In a possible implementation, the receiving module 1101 is configured to: receive the first indication information transmitted through UCI; or, receive the first indication information transmitted through message 3 in a 4-step random access procedure or message A in a 2-step random access procedure.

Optionally, the UCI further includes a beam measurement result or a channel state information measurement result, In a possible implementation, the receiving module 1101 is configured to: receive the first indication information transmitted through an uplink PHR; or, receive the first indication information transmitted through an uplink power limit report, in which the uplink power limit report is configured to indicate a power limit due to the MPE limit.

Optionally, the receiving module 1101 is configured to receive the first indication information through a PUCCH or a PUSCH.

Optionally, the receiving module 1101 is configured to: receive the first indication information for indicating a maximum permissible transmit power of a first uplink beam, in which the first uplink beam is an uplink beam with the maximum permissible transmit power less than a maximum transmit power of the terminal, or, the first uplink beam is any uplink beam, or, the first uplink beam is an uplink beam with the maximum permissible transmit power not greater than the maximum transmit power of the terminal, the maximum transmit power of the terminal is a maximum transmit power corresponding to the first uplink beam and configured by a network device, or the maximum transmit power of the terminal is a maximum transmit power corresponding to -the first uplink beam and supported by a capability of the terminal.

Figure 12:
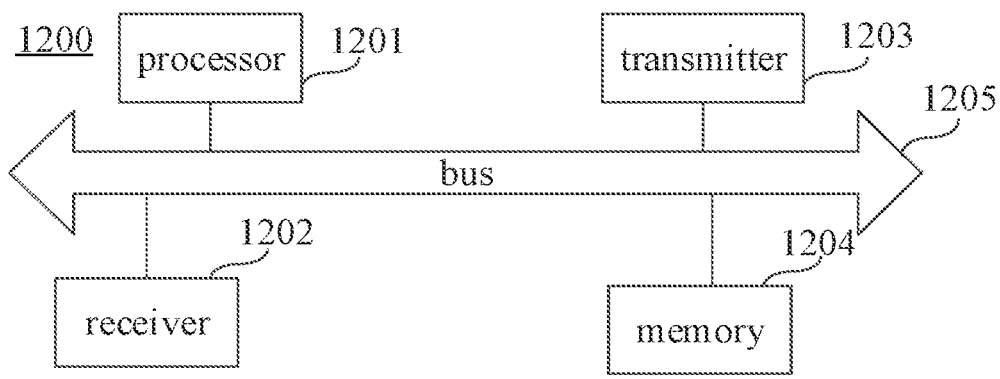
FIG. 12 is a block diagram of a terminal according to some embodiments.

FIG. 12 is a block diagram of a terminal 1200 according to some embodiments. As shown in FIG. 12, the terminal 1200 may include: a processor 1201, a receiver 1202, a transmitter 1203, a memory 1204, and a bus 1205.

The processor 1201 includes one or more processing cores, and the processor 1201 executes various functional applications and information processing by running software programs and modules.

The receiver 1202 and the transmitter 1203 may be implemented as a communication component, which may be a communication chip.

The memory 1204 is connected to the processor 1201 through the bus 1205.

The memory 1204 may be configured to store at least one instruction, and the processor 1201 is configured to execute the at least one instruction, so as to execute the method performed by the terminal in the methods provided by embodiments of the disclosure.

Additionally, the memory 1204 may be implemented by any type or combination of volatile or non-volatile storage devices. The volatile or non-volatile storage device include, but is not limited to, magnetic or optical disk, electrically erasable programmable read only memory (EEPROM), erasable programmable read only memory (EPROM), static random access memory (SRAM), read only memory (ROM), magnetic memory, flash memory, or programmable read only memory (PROM).

In some embodiments, a computer-readable storage medium is also provided, in which the computer-readable storage medium stores at least one instruction, at least one piece of program, a code set, or an instruction set, and the at least one instruction, the at least one piece of program, the code set, or the instruction set is loaded and executed by the processor to implement the method for indicating a transmit power provided by each of the foregoing method embodiments.

Figure 13:
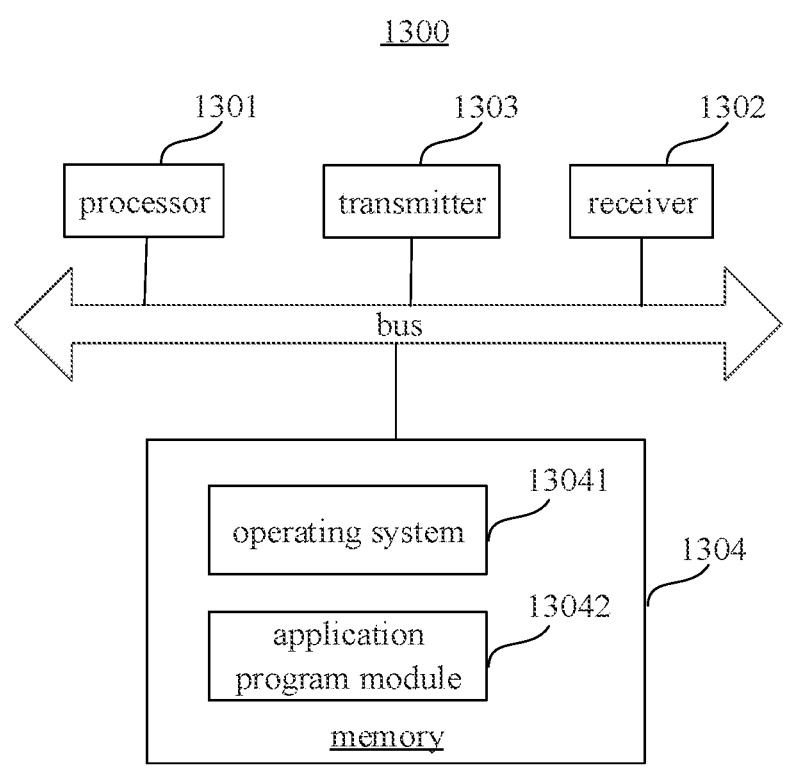
FIG. 13 is a block diagram of a network device according to some embodiments.

FIG. 13 is a block diagram of a network device 1300 according to some embodiments. As shown in FIG. 13, the network device 1300 may include: a processor 1301, a receiver 1302, a transmitter 1303, and a memory 1304. The receiver 1302, the transmitter 1303, and the memory 1304 are respectively connected to the processor 1301 through a bus.

The processor 1301 includes one or more processing cores, and the processor 1301 executes the method performed by the network device in the methods provided by embodiments of the disclosure by running software programs and modules. The memory 1304 may be configured to store software programs and modules. Specifically, the memory 1304 may store the operating system 13041 and the application program module 13042 required for at least one -function. The receiver 1302 is configured to receive communication data transmitted by other devices, and the transmitter 1303 is configured to transmit communication data to other devices.

In some embodiments, a computer-readable storage medium is also provided, in which the computer-readable storage medium stores at least one instruction, at least one piece of program, a code set, or an instruction set, and the at least one instruction, the at least one piece of program, the code set, or the instruction set is loaded and executed by the processor to implement the method for determining a transmit power provided by each of the foregoing method embodiments.

Some embodiments of the disclosure also provide a communication system, in which the communication system includes the terminal and the network device. The terminal is the terminal provided by embodiments shown in FIG. 12, The network device is the network device provided by embodiments shown in FIG. 13.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawing, and that various modifications and changes can be made without departing from the scope thereof. It is intended that the scope of the disclosure only be limited by the appended claims.

The invention claimed is:

1. A method for indicating a transmit power, performed by a terminal, the method comprising:
   determining a maximum permissible transmit power of at least one uplink beam of the terminal, wherein the maximum permissible transmit power is a maximum transmit power subject to satisfying a maximum permissible exposure (MPE) limit of the terminal; and
   transmitting first indication information for indicating the maximum permissible transmit power of the at least one uplink beam,
   wherein the first indication information comprises an identifier of the uplink beam and power-related information of the uplink beam, and the power-related information comprises a difference between the maximum permissible transmit power and a maximum transmit power of the terminal.

2. The method of claim 1, wherein transmitting the first indication information for indicating the maximum permissible transmit power of the at least one uplink beam comprises at least one of:
   transmitting the first indication information through an uplink power headroom report (PHR); or
   transmitting the first indication information through an uplink power limit report, wherein the uplink power limit report is configured to indicate a power limit due to the MPE limit.

3. The method of claim 1, wherein transmitting the first indication information for indicating the maximum permissible transmit power of the at least one uplink beam comprises:
   transmitting the first indication information through a physical uplink shared channel (PUSCH).

4. The method of claim 1, wherein transmitting the first indication information for indicating the maximum permissible transmit power of the at least one uplink beam comprises:
   transmitting the first indication information for indicating a maximum permissible transmit power of a first uplink beam, wherein the first uplink beam is one of:
   an uplink beam with the maximum permissible transmit power less than a maximum transmit power of the terminal, any uplink beam, or
   an uplink beam with the maximum permissible transmit power not greater than the maximum transmit power of the terminal;
   wherein the maximum transmit power of the terminal is one of a maximum transmit power corresponding to the first uplink beam and configured by a network device, or the maximum transmit power corresponding to the first uplink beam and supported by a capability of the terminal.

5. The method of claim 1, wherein the power-related information further comprises one or more of: the maximum permissible transmit power, a power interval to which the maximum permissible transmit power belongs, or a level corresponding to the maximum permissible transmit power,
   wherein the maximum transmit power of the terminal is one of a maximum transmit power corresponding to the uplink beam and configured by a network device, or the maximum transmit power corresponding to the uplink beam and supported by a capability of the terminal.

6. The method of claim 5, wherein the identifier of the uplink beam comprises a reference signal identifier, and the reference signal identifier comprises at least one of: a synchronization signal block (SSB) ID, or a channel state information reference signal (CSI-RS) ID.

7. The method of claim 1, wherein determining the maximum permissible transmit power of the at least one uplink beam of the terminal comprises:
   obtaining second indication information for indicating a maximum MPE value of the terminal; and
   determining the maximum permissible transmit power of the at least one uplink beam of the terminal based on the MPE value.

8. The method of claim 7, wherein obtaining the second indication information for indicating the maximum MPE value of the terminal comprises:
   receiving the second indication information transmitted by a network device.

9. A computer-readable storage medium having stored therein instructions that, when executed by a processor, cause the processor to perform the method of claim 1.

10. A method for determining a transmit power, performed by a network device, the method comprising:
    receiving first indication information for indicating a maximum permissible transmit power of at least one uplink beam of a terminal, wherein the maximum permissible transmit power is a maximum transmit power subject to satisfying a maximum permissible exposure (MPE) limit of the terminal; and
    determining the maximum permissible transmit power of the uplink beam based on the first indication information,
    wherein the first indication information comprises an identifier of the uplink beam and power-related information of the uplink beam, and the power-related information comprises a difference between the maximum permissible transmit power and a maximum transmit power of the terminal.

11. The method of claim 10, wherein the power-related information further comprises one or more of: the maximum permissible transmit power, a power interval to which the maximum permissible transmit power belongs, a level corresponding to the maximum permissible transmit power, wherein the maximum transmit power of the terminal is one of a maximum transmit power corresponding to the uplink beam and configured by a network device, or the maximum transmit power corresponding to the uplink beam and supported by a capability of the terminal.

12. A terminal, comprising:

a processor; and a memory for storing instructions executable by the processor;

wherein the processor is configured to:

determine a maximum permissible transmit power of at least one uplink beam of the terminal, wherein the maximum permissible transmit power is a maximum transmit power subject to satisfying a maximum permissible exposure (MPE) limit of the terminal; and transmit first indication information for indicating the maximum permissible transmit power of the at least one uplink beam, wherein the first indication information comprises an identifier of the uplink beam and power-related information of the uplink beam, and the power-related information comprises a difference between the maximum permissible transmit power and a maximum transmit power of the terminal.

13. The terminal of claim 12, wherein the processor is further configured to perform at least one of:

transmitting the first indication information through an uplink power headroom report (PHR); or transmitting the first indication information through an uplink power limit report, wherein the uplink power limit report is configured to indicate a power limit due to the MPE limit.

14. The terminal of claim 12, wherein the processor is further configured to:

transmit the first indication information through a physical uplink shared channel (PUSCH).

* * * * *